United States Patent
Matsuyama et al.

(10) Patent No.: US 8,623,502 B2
(45) Date of Patent: Jan. 7, 2014

(54) CLEAR-COATED STAINLESS STEEL SHEET WITH EXCELLENT PRESSURE MARK RESISTANCE AND SCRATCH RESISTANCE

(75) Inventors: Hiroyuki Matsuyama, Osaka (JP); Haruki Ariyoshi, Tokyo (JP); Youichirou Yasuda, Amagasaki (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 0 days.

(21) Appl. No.: 13/636,532

(22) PCT Filed: Mar. 28, 2011

(86) PCT No.: PCT/JP2011/057712
§ 371 (c)(1),
(2), (4) Date: Sep. 21, 2012

(87) PCT Pub. No.: WO2011/122587
PCT Pub. Date: Oct. 6, 2011

(65) Prior Publication Data
US 2013/0011615 A1    Jan. 10, 2013

(30) Foreign Application Priority Data

Mar. 30, 2010   (JP) ................................. 2010-077367
Feb. 14, 2011   (JP) ................................. 2011-029016

(51) Int. Cl.
*B32B 5/16*    (2006.01)

(52) U.S. Cl.
USPC ........... 428/327; 428/403; 428/407; 428/457; 428/461

(58) Field of Classification Search
USPC ........................... 428/457, 461, 327, 403, 407
See application file for complete search history.

(56) References Cited

FOREIGN PATENT DOCUMENTS

| | | |
|---|---|---|
| EP | 0 008 156 | 2/1980 |
| JP | 10-193508 | 7/1998 |
| JP | 2003-154309 | 5/2003 |
| JP | 2004-050657 | 2/2004 |
| JP | 2005-028851 | 2/2005 |
| JP | 2005-313630 | * 11/2005 |
| JP | 2007-098883 | 4/2007 |
| JP | 2008-149607 | 7/2008 |
| WO | 00/55269 | 9/2000 |
| WO | 02/083803 | 10/2002 |

OTHER PUBLICATIONS

International Search Report dated Jul. 5, 2011, issued in corresponding PCT Application No. PCT/JP2011/057712.
European Search Report dated Sep. 25, 2013 issued in corresponding EP Application No. 11 76 2811.

* cited by examiner

*Primary Examiner* — Leszek Kiliman
(74) *Attorney, Agent, or Firm* — Kenyon & Kenyon LLP

(57) ABSTRACT

This clear-coated stainless steel sheet includes: a stainless steel sheet; and a clear-coated film coated on either one or both of two main surfaces of the stainless steel sheet, wherein the clear-coated film contains a thermosetting resin composition (A) and resin beads (B) at a content in a range of 0.5 parts by mass to 4.0 parts by mass relative to 100 parts by mass of a solid content of the thermosetting resin composition (A), the thermosetting resin composition (A) includes an acrylic resin (A1) and a cross-linked curing resin (A2) composed of a blocked isocyanate resin and an amino resin which cross-link and cure the acrylic resin (A1), the acrylic resin (A1) includes one or more cross-linking functional groups selected from a hydroxyl group, a carboxylic group, and an alkoxy silane group, and the acrylic resin (A1) has a glass transition temperature of 30° C. to 90° C., and has a number average molecular weight of 3000 to 50000.

2 Claims, No Drawings

CLEAR-COATED STAINLESS STEEL SHEET WITH EXCELLENT PRESSURE MARK RESISTANCE AND SCRATCH RESISTANCE

TECHNICAL FIELD

The present invention relates to a clear-coated stainless steel sheet with excellent anti-pressure printing property (pressure mark resistance) and excellent scratch resistance.

This application is a national stage application of International Application No. PCT/JP2011/057712, filed Mar. 28, 2011, which claims priority to Japanese Patent Application No. 2010-077367 filed on Mar. 30, 2010 and Japanese Patent Application No. 2011-029016 filed on Feb. 14, 2011, the contents of which are incorporated herein by reference.

BACKGROUND ART

A clear-coated stainless steel sheet has frequently been used for chassis of home appliances, interior furnishing materials, and external materials because a luxury appearance can be obtained using the characteristic aesthetically pleasing metallic gloss of a stainless steel. However, since the clear-coated stainless steel sheet has a feature of an extremely high gloss, there is a problem in that pressure printings caused by pressures during coiling of the steel sheet or scratches on the coated surface are easily noticed.

With regard to a clear-coated stainless steel sheet with excellent scratch resistance and excellent workability, a method of manufacturing a clear-coated stainless steel sheet with enhanced workability and enhanced scratch resistance is disclosed which includes a primer coating process and a top coating process (for example, Patent Document 1). In the primer coating process, a coating film having a low elastic modulus and a thick film thickness is formed by a two coat and two bake system (coating two times and drying two times). In the top coating process, a coating film having a high elastic modulus and a thin film thickness is formed. However, it is necessary to include the coating process of two coat and two bake, and it is necessary to differentiate coating materials of the primer coat and coating materials of the top coat and to control the respective film thicknesses as well. Therefore, extremely complicated coating management is required, which is unrealistic in consideration of the workability.

In addition, it has been reported that, with regard to a method of coating both of the front and rear surfaces of a base material, anti-pressure printing property is improved by adding resin particles to a rear surface coating portion (Patent Document 2). Generally, in the case of a coated steel sheet in which an ordinary steel is used, it is common to coat the rear surface in order to suppress the occurrence of rusts. However, there are cases in which coating on the rear surface is restricted depending on products in which the manufactured coated steel sheet is used. In addition, since it is necessary to carry out special coating for the rear surface, this results in an additional increase in the costs.

Furthermore, it has been reported that, when a pre-coated steel sheet is manufactured by a two coat and two bake system, the anti-pressure printing property is improved by adding resin beads to the top coat, and the particle diameter of the resin beads is defined (Patent Document 3). However, since the film thickness of the coated film is thick, and the particle diameter of the beads is large in the pre-coated steel sheet, it is difficult to apply the method to stainless clear coating from the viewpoint of designability.

Meanwhile, as the related art in which the amount of the resin beads is defined, a technique is reported that improves the designability of a clear-coated stainless steel sheet by a one coat and one bake process (Patent Document 4). However, the anti-pressure printing property during manufacturing is not described.

So far, a clear-coated stainless steel sheet has not been developed yet in which anti-pressure printing property, scratch resistance, and workability are balanced, and which can be manufactured by a once coating and once baking method with excellent workability such that baking can be conducted within a short time.

PRIOR ART DOCUMENT

Patent Document

Patent Document 1: Japanese Unexamined Patent Application, First Publication No. 2003-154309
Patent Document 2: Japanese Unexamined Patent Application, First Publication No. 2005-28851
Patent Document 3: Japanese Unexamined Patent Application, First Publication No. H10-193508
Patent Document 4: Japanese Unexamined Patent Application, First Publication No. 2005-313630

DISCLOSURE OF THE INVENTION

Problems to be Solved by the Invention

Therefore, a clear-coated stainless steel sheet was studied in which pressure printings and scratches are not easily noticed and which has excellent productivity and can be manufactured by the once coating and once baking method. As a result, it was found that characteristics of a thermosetting acrylic resin composition are important, and it is effective to add a predetermined amount of acrylic resin beads. However, pressure printings and scratches are caused by pressures during coiling of the stainless steel sheet, and the pressure printings and the scratches degrade the designability of the clear coating of the stainless steel sheet. Therefore, it was also found that, when the weight of a coil is increased during mass production from the viewpoint of manufacturing costs, pressure printings are necessarily caused.

The present invention has been made in consideration of such circumstances, and the present invention aims to provide a clear-coated stainless steel sheet which has economic advantage such that the clear-coated stainless steel sheet can be manufactured under manufacturing conditions for mass production in which the weight of a coil is large, and furthermore, the clear-coated stainless steel sheet is excellent in anti-pressure printing property and scratch resistance.

Means for Solving the Problems

Therefore, further studies were carried out, and consequently, it was found that selection of resin beads and the relationship between the thickness of a clear-coated film and the average particle diameter of the resin beads are important, and the present invention has been completed.

(1) A clear-coated stainless steel sheet with excellent anti-pressure printing property and scratch resistance according to an aspect of the invention includes: a stainless steel sheet; and a clear-coated film coated on either one or both of two main surfaces of the stainless steel sheet.

The clear-coated film contains a thermosetting resin composition (A) and resin beads (B) at a content in a range of 0.5 parts by mass to 4.0 parts by mass relative to 100 parts by mass of a solid content of the thermosetting resin composition (A).

The thermosetting resin composition (A) includes an acrylic resin (A1) and a cross-linked curing resin (A2) composed of a blocked isocyanate resin and an amino resin which cross-link and cure the acrylic resin (A1).

The acrylic resin (A1) includes one or more cross-linking functional groups selected from a hydroxyl group, a carboxylic group, and an alkoxy silane group, and the acrylic resin (A1) has a glass transition temperature of 30° C. to 90° C., and has a number average molecular weight of 3000 to 50000.

(2) In the clear-coated stainless steel sheet with excellent anti-pressure printing property and scratch resistance according to the above (1), an average particle diameter of the resin beads (B) may be in a range of 0.20 times to 3.0 times a film thickness of the clear-coated film.

(3) In the clear-coated stainless steel sheet with excellent anti-pressure printing property and scratch resistance according to the above (1) or (2), the resin beads (B) may be one or more kinds selected from cross-linked acrylic resin beads, cross-linked polyurethane resin beads, and fluororesin beads.

Effects of the Invention

According to the clear-coated stainless steel sheet according to the aspect of the invention, the clear-coated film contains the thermosetting resin composition and a predetermined amount of the resin beads, and the thermosetting resin composition includes the acrylic resin, the blocked isocyanate resin and the amino resin as resins for cross-link and curing. Therefore, the anti-pressure printing property and scratch resistance of the clear-coated stainless steel sheet can be enhanced. In addition, since the anti-pressure printing property is excellent, the clear-coated stainless steel sheet can be manufactured under manufacturing conditions for mass production in which the weight of a coil is large; and therefore, the clear-coated stainless steel sheet has economic advantage.

Furthermore, according to the clear-coated stainless steel sheet according to the aspect of the invention, the average particle diameter of the resin beads is defined by the relative size with respect to the film thickness of the clear-coated film; and thereby, the anti-pressure printing property and the scratch resistance of the clear-coated stainless steel sheet can be further enhanced.

BEST MODE FOR CARRYING OUT THE INVENTION

In the clear-coated stainless steel sheet of the present embodiment, clear-coated films composed of a resin composition for clear coating are coated and formed on a single surface or both surfaces of the stainless steel sheet. The resin composition for clear coating contains a thermosetting resin composition (A) including an acrylic resin (A1) and a cross-linked curing resin (A2) and resin beads (B) at a content of 0.5 parts by mass to 4.0 parts by mass relative to 100 parts by mass of a solid content of the thermosetting resin composition (A).

Firstly, the thermosetting resin composition (A) which is a principal resin of the resin composition for clear coating will be described.

"Thermosetting Resin Composition (A)"

The thermosetting resin composition (A) contains the acrylic resin (A1) and the cross-linked curing resin (A2). The acrylic resin (A1) includes one or more cross-linking functional groups selected from a hydroxyl group, a carboxylic group, and an alkoxy silane group, and the acrylic resin (A1) has a glass transition temperature of 30° C. to 90° C., and has a number average molecular weight of 3000 to 50000. The cross-linked curing resin (A2) is composed of a blocked isocyanate resin and an amino resin which cross-link and cure the acrylic resin.

"Acrylic resin (A1)"

The acrylic resin (A1) having one or more cross-linking functional groups selected from a hydroxyl group, a carboxylic group, and an alkoxy silane group in the embodiment is a substance that can be obtained by a well-known method as a coating resin.

The acrylic resin (A1) can be obtained by reacting a non-functional monomer with one or more polymeric monomers having a cross-linking functional group such as a hydroxyl group, a carboxylic group, or an alkoxy silane group.

Examples of the non-functional monomer include one or more kinds selected from a group consisting of: aliphatic or cyclic acrylates such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, n-hexyl methacrylate, cyclohexyl acrylate, cyclohexyl methacrylate, and lauryl methacrylate; ethers such as methyl vinyl ether, ethyl vinyl ether, n-propyl vinyl ether, and n-butyl vinyl ether; styrene such as styrene, and α-methylstyrene; acrylamide-based monomers such as acrylamide, N-methylol acrylamide, diacetone acrylamide; and the like.

The polymeric monomer containing one or more hydroxyl groups in one molecule includes: hydroxylalkyl esters such as 2-hydroxyethyl acrylate, 2-hydroxyethyl methacrylate, hydroxypropyl acrylate, and hydroxypropyl methacrylate; and lactone-modified hydroxyl group-containing vinyl polymerized monomers such as PLACCEL FM1 to FM5 or FA-1 to FA-5 (manufactured by Daicel Corporation). All of the compounds that are exemplified above are also polymeric monomers having a hydroxyl group and a polymeric unsaturated double bond.

The polymeric monomer having a carboxylic group is a compound containing one or more carboxylic groups and one or more polymeric unsaturated double bonds respectively in one molecule, and examples thereof include acrylic acids, methacrylic acids, itaconic acids, maleic acids, fumaric acids, and the like.

Examples of the polymeric monomer having an alkoxy silane group include vinyl trimethoxy silane, vinyl triethoxy silane, methacryloxy propyl trimethoxy silane, and the like. The compounds exemplified above are also compounds containing one or more alkoxy silane groups and one or more polymeric unsaturated double bonds respectively in one molecule.

The acrylic resin (A1) obtained from the above-described raw materials can have two or more cross-linking functional groups such as a hydroxyl group, a carboxylic group, an alkoxy silane group, or the like in one molecule.

The number average molecular weight of the acrylic resin (A1) is preferably in a range of 3,000 to 50,000, and particularly, more preferably in a range of 4,000 to 20,000. In the case where the number average molecular weight is less than 3,000, there are cases in which the reactivity with a cross-linking agent is excessively poor such that no coated film can be formed, which is not preferable. In the case where the number average molecular weight exceeds 50,000, there are cases in which the solubility in a solvent is insufficient such that a resin fluid is not formed.

The glass transition temperature of the acrylic resin (A1) is preferably in a range of 30° C. to 90° C., and more preferably in a range of 50° C. to 90° C. In the case where the glass transition temperature of the acrylic resin (A1) is lower than 30° C., when the temperature of the surface of the steel sheet increases to 80° C. to 100° C. due to friction and heat generation during continuous pressing, there are cases in which the coated film is softened, and the coated resin attaches to a mold, which are not preferable. In addition, in the case where the glass transition temperature exceeds 90° C., workability during coating degrades such that occurrence of pinholes, lack of leveling, and the like are caused, which is not preferable.

"Cross-Linked Curing Resin (A2)"

Next, the cross-linked curing resin (A2) which is another component of the thermosetting resin composition (A) is a mixture of the blocked isocyanate resin and the amino resin.

The blocked isocyanate resin is a compound having two or more isocyanate groups in one molecule, which is obtained by blocking a polyisocyanate using a blocking agent such as phenols, oximes, active methylenes, ε-caprolactams, triazoles, pyrazoles, or the like. An organic tin catalyst such as dibutyl tin laureate or the like is used as a dissociation promoter of the blocking agent.

Examples of the polyisocyanate include: aromatic diisocyanates such as tolylene diisocyanates, diphenyl-methane diisocyanates, xylene diisocyanates, and naphthalene diisocyanates; aliphatic diisocyanates such as hexamethylene diisocyanates and dimer acid diisocyanates; alicyclic diisocyanates such as isophorone diisocyanates and cyclohexane diisocyanates; Biuret-type adducts and isocyanurate ring adducts of the polyisocyanates; and the like.

Commercially available products of the blocked isocyanate resin include: commercially available products manufactured by Sumika Bayer Urethane Co., Ltd. such as DESMODUR BL1100, BL1265MPA/X, VPLS2253/1, BL3475BS/SN, BL3272MPA, BL3370MPA, BL4265SN, DESMOTHERM 2170, and SUMIDUR 3175; commercially available products manufactured by Asahi Kasei Chemicals Corporation such as DURANATE 17B-60PX, TPA-B80X, MF-B60X, MF-K60X, and E-402-B80T; commercially available products manufactured by DIC Corporation such as BURNOCK DB-980K, D-550, B3-867, and B4-887-60; commercially available products manufactured by Nippon Polyurethane Industry Co., Ltd. such as CORONATE 2515, 2507, and 2513; and the like, and one of them may be solely used, or a combination of two or more of them may be used.

The amino resin is a collective term for resins obtained by subjecting an amino compound (melamine, guanamine, or urea) and formaldehyde (formalin) to an addition reaction and modifying the resulting product using an alcohol. Examples of the amino resin for a coating material include a melamine resin, a benzoguanamine resin, an urea resin, a butylated urea resin, a butylated urea melamine resin, a glycoluril resin, an acetoguanamine resin, and a cyclohexyl guanamine resin. Among them, the melamine resin is preferable in terms of scratch resistance and chemical resistance which originate from thermosetting properties. The melamine resin is divided into a methylated melamine resin, an n-butylated melamine resin, an isobutylated melamine resin, a mixed alkylated melamine resin, and the like depending on the kind of the alcohol being modified.

Examples of the methylated melamine resin include: commercially available products manufactured by Mitsui Cytec Ltd. such as CYMEL 300, 301, 303, 350, 370, 771, 325, 327, 703, 712, 715, 701, 267, 285, 232, 235, 236, 238, 211, 254, 204, 212, 202, and 207; commercially available products manufactured by BASF Corporation such as LUWIPAL 063, 066, 068, 069, 072, and 073; commercially available products manufactured by DIC Corporation such as SUPER BECKAMINE L-105; commercially available products manufactured by Hitachi Chemical Co., Ltd. such as MELANE 522, 523, 620, 622, and 623; and the like.

Examples of the n-butylated melamine resin include: commercially available products manufactured by Mitsui Cytec Ltd. such as MYCOAT 506 and 508; commercially available products manufactured by Mitsui Chemicals, Inc. such as UBAN 20SB, 20SE, 21R, 22R, 122, 125, 128, 220, 225, 228, 28-60, 20HS, 2020, 2021, 2028, and 120; commercially available products manufactured by BASF Corporation such as PLASTOPAL EBS 100A, 100B, 400B, 600B, and CB; commercially available products manufactured by DIC Corporation such as SUPER BECKAMINE J-820, L-109, L-117, L-127, and L-164; commercially available products manufactured by Hitachi Chemical Co., Ltd. such as MELANE 21A, 22, 220, 1303, 2000, 2030, and 8000; commercially available products manufactured by Hitachi Kasei Polymer Co., Ltd. such as Tesazine 3020, 3021, and 3036; and the like.

Examples of the isobutylated melamine resin include: commercially available products manufactured by Mitsui Chemicals, Inc. such as UBAN 60R, 62, 62E, 360, 361, 165, 166-60, 169, and 2061; commercially available products manufactured by DIC Corporation such as SUPER BECKAMINE G-821, L-145, L-110, and L-125; commercially available products manufactured by BASF Corporation such as PLASTOPAL EBS 4001, FIB, H731B, and LR8824; commercially available products manufactured by Hitachi Chemical Co., Ltd. such as MELANE 27, 28, 28D, 245, 265, 269, and 289; and the like.

Examples of the mixed alkylated melamine resin include commercially available products manufactured by Mitsui Cytec Ltd. such as CYMEL 267, 285, 232, 235, 236, 238, 211, 254, 204, 212, 202, and 207, and the like.

One of them may be solely used, or a combination of two or more of them may be used.

The component ratio (content ratio) of both of the acrylic resin (A1) and the cross-linked curing resin (A2) in the thermosetting resin composition (A) can be changed within a wide range according to purpose. The amount of the isocyanate group in the blocked isocyanate resin is in a range of 0.1 moles to 1.0 mole and preferably in a range of 0.2 moles to 0.8 moles with respect to 1 mole of a (OH+COOH) group in the acrylic resin (A1). In addition, the amount of the amino resin is in a range of 5 parts by mass to 25 parts by mass, and preferably in a range of 8 parts by mass to 15 parts by mass with respect to 100 parts by mass of a solid content of the acrylic resin (A1). In the case where the added amount of the cross-linked curing resin (A2) is small, the scratch resistance deteriorates. In the case where the added amount of the cross-linked curing resin (A2) is large, the bending workability deteriorates; and as a result, fine cracks are caused in the coated film during processing, and this leads to the deterioration of the corrosion resistance.

Generally, a sulfonic acid-based catalyst or amine-based catalyst is used as a curing catalyst of the amino resin. In order to realize baking for a short time which is a feature of the embodiment, p-toluene sulfonic acid or dodecyl benzene sulfonic acid, which is a sulfonic acid-based catalyst, is preferable. It is desirable to contain p-toluene sulfonic acid or dodecyl benzene sulfonic acid at a solid content of 0.1 parts by mass to 3.0 parts by mass, and preferably 0.3 parts by mass to 1.0 part by mass relative to 100 parts by mass of the solid content of the thermosetting resin composition (A). In the case where the amount of the curing catalyst of the amino resin is 0.1 parts by mass or less, the effect cannot be obtained. In the case where the amount of the curing catalyst of the amino resin is 3 parts by mass or more, the curing effect becomes saturated, and in addition, the workability deteriorates.

Examples of the curing catalyst of the blocked isocyanate resin include di-n-butyl tin oxide, di-n-butyl tin chloride, di-n-butyl tin dilaureate, di-n-butyl tin diacetate, di-n-octyl tin oxide, di-n-octyl tin dilaureate, tetra-n-butyl tin, and the like. They may be added according to necessity respectively, and one of them may be solely used, or a mixture of two or more of them may be used.

The resin composition for clear coating may be further mixed with additives such as a leveling agent, a defoamer, an oxidation inhibitor, an ultraviolet absorber, a delustrant, a silane coupling agent, and the like so as to be made into a coating material. In addition, the resin composition may be made into a color clear-coated film by dispersing a pigment or a dye, or the resin composition may be mixed with a luster material such as aluminum paste or a pearlescent pigment, so as to exhibit designing. In addition, the resin composition may contain an epoxy resin, a silicon resin, a fluororesin, a polyester resin, and the like according to necessity.

By including the acrylic resin (A1) and the cross-linked curing resin (A2) having the above-described compositions, a clear-coated stainless steel sheet having aesthetically pleasing metallic gloss of stainless steel can be manufactured through one coating and one baking (coating once and drying once).

"Resin Beads (B)"

Subsequently, the resin beads (B) will be described that exhibits anti-pressure printing property and scratch resistance which are important to secure the qualities of the clear-coated stainless steel sheet.

The resin composition for clear coating of the embodiment contains the resin beads (B) at a content of 0.5 parts by mass to 4.0 parts by mass relative to 100 parts by mass of the thermosetting resin composition (A).

In the case where the content of the resin beads is less than 0.5 parts by mass, the effect of improving the scratch resistance cannot be obtained. In the case where the content of the resin beads exceeds 4.0 parts by mass, the transparency of the clear coated film deteriorates, and in addition, the coating workability degrades. The content of the resin beads is particularly preferably in a range of 1.0 part by mass to 3.0 parts by mass, and more preferably in a range of 1.0 part by mass to 2.0 parts by mass.

It is preferable that the resin beads (B) have an average particle diameter that is in a range of 0.20 times to 3.0 times the required coating film thickness of the clear-coated film. In the case where the resin beads are used which have an average particle diameter that is in a range of 0.20 times to 3.0 times the required coating film thickness of the clear-coated film, favorable anti-pressure printing property and scratch resistance, which are features of the embodiment, can be obtained without a great degradation of the gloss of the clear-coated film. In the case where the average particle diameter of the resin beads (B) is less than 0.20 times the required coating film thickness, the particle diameters of the resin beads are too small; and therefore, the function as an aggregate degrades, and the effects of improving the anti-pressure printing property and the scratch resistance are not exhibited. In the case where the average particle diameter of the resin beads (B) is more than 3.0 times the required coating film thickness, a lot of resin beads protrude from the surface layer of the coated film; and thereby, the surface roughens, and the gloss degrades.

The average particle diameter of the resin beads (B) is preferably in a range of 0.3 times to 2.0 times, more preferably in a range of 0.5 times to 1.3 times, and most preferably in a range of 0.8 times to 1.0 time the required coating film thickness of the clear-coated film. The average particle diameter of the resin beads (B) is generally obtained from a particle diameter distribution measured by a laser diffraction method.

Examples of the material of the resin beads (B) include an acrylic resin, a polyurethane resin, a benzoguanamine resin, a styrene resin, a polyethylene resin, a polypropylene resin, a fluororesin, and the like. In order to obtain the anti-pressure printing property and the scratch resistance, which are the purposes of the embodiment, the hardness of the resin itself is required. Therefore, the material of the resin beads (B) is preferably an acrylic resin, a polyurethane resin, or a fluororesin. In addition, since the coating material is solvent-based, solvent resistance is required; and therefore, cross-linked resin beads are preferable.

Examples of the cross-linked acrylic resin beads include: commercially available products manufactured by Negami Chemical Industrial Co., Ltd. such as ART PEARL A-400, G-200, G-400, G-600, G-800, GR-200, GR-300, GR-400, GR-600, GR-800, J-4P, J-5P, J-7P, and S-5P; commercially available products manufactured by Sekisui Plastics Co., Ltd. such as TECHPOLYMER MBX-8, MBX-12, MBX-15, MBX-30, MBX-40, MBX-50, MB20X-5, MB20X-30, MB30X-5, MB30X-8, MB30X-20, BM30X-5, BM30X-8, BM30X-12, ARX-15, ARX-30, MBP-8, and ACP-8; commercially available products manufactured by Soken Chemical & Engineering Co., Ltd. such as CHEMISNOW MX-150, MX-180TA, MX-300, MX-500, MX-500H, MX-1000, MX-1500H, MX-2000, MX-3000, MR-2HG, MR-7HG, MR-10HG, MR-3GSN, MR-2G, MR-7G, MR-10G, MR-20G, MR-30G, MR-60G, and MR-90G; commercially available products manufactured by Ganz Chemical Co., Ltd. such as STAPHYLOID AC-3355, AC-3816, AC-3832, AC-4030, AC-3364, GM-0401S, GM-0801, GM-1001, GM-2001, GM-2801, GM-4003, GM-5003, GM-9005, and GM-6292; and the like.

Examples of the cross-linked polyurethane resin beads include commercially available products manufactured by Negami Chemical Industrial Co., Ltd. such as ART PEARL C-100, C-200, C-300, C-400, C-800, CZ-400, P-400T, P-800T, HT-400BK, U-600T, CF-600T, MT-400BR, MT-400YO, and the like.

Examples of the fluororesin beads include: commercially available products manufactured by Sumitomo 3M Limited such as DYNEON PTFE micro powder TF-9201, TF-9205, and TF-9207; commercially available products manufactured by Asahi Glass Co., Ltd. such as Fluon PTFE lubricant L-150J, L-169J, L-170J, L-172J, and L-173J; and the like.

They may be added according to necessity, and one of them may be solely used, or a mixture of two or more of them may be used.

In addition, in the case where a wax such as a polyethylene wax, a lanolin wax, or the like is mixed as other added component of the resin composition for clear coating, the slipping property is improved; and thereby, the scratch resistance is further improved.

In order to color the resin composition for clear coating, a variety of transparent organic pigments and transparent inorganic pigments may be added. In addition, the resin composition may also contain luster materials such as a variety of pearlescent pigments and aluminum pastes in order to improve the designability of the resin composition for clear coating. In such a case, demands for the designability becomes stricter, and thus there are cases in which fine pressure printings or scratches cause a problem that may be barely considered as a problem for transparent clear coated film in the related art. Therefore, it is necessary to manage the thickness of the coated film or manage the particle diameters of the resin beads within a more preferable range. In order to do so, a method is desirable in which the resin beads are subjected to a dispersion process so as to further narrow the particle size distribution of the resin beads, and then the resin beads are added to the resin composition.

In the clear-coated stainless steel sheet of the embodiment, the film thickness of the clear-coated film is preferably in a range of 1 μm to 10 μm, more preferably in a range of 2 μm to 6 μm, and most preferably in a range of 3 μm to 5 μm. In the case where the film thickness of the clear-coated film exceeds 10 μm, the coating workability during one coating and one baking deteriorates. In addition, the bending workability of the clear-coated film degrades such that fine cracks are caused during a winding (bending) process, and this leads to the deterioration of the corrosion resistance. Furthermore, when the film thickness increases, the average particle diameter of the resin beads that are added to secure the anti-pressure printing property needs to increase. In the case where the average particle diameter of the resin beads is large, the designability of the clear-coated stainless steel sheet degrades. In addition, in the case where the film thickness of the clear-coated film is less than 1 μm, it becomes difficult to control the film thickness, and the designability degrades.

Before the clear-coated film is coated, it is preferable to subject the stainless steel sheet to chemical pretreatment. A non chromate chemical pretreatment fluid is preferable in view of environmental issues. Generally, an amino silane-based coupling agent or epoxy silane-based coupling agent is preferable. The stainless steel is subjected to chemical pretreatment under condition where the adhesion amount of the chemical pretreatment fluid becomes in a range of 2 mg/m$^2$ to 50 mg/m$^2$ (the amount of $SiO_2$ is measured using fluorescent X-rays), and then the stainless steel is baked to be dried under condition where the peak material temperature (PMT) of the stainless steel sheet becomes in a range of approximately 60° C. to 140° C.

Examples of the amino-silane-based coupling agent include N-2(aminoethyl)-3-aminopropyl-methyl-dimethoxy-silane, N-2(aminoethyl)-3-aminopropyl-triethoxy-silane, 3-amino-propyl-trimethoxy-silane, and 3-amino-propyl-triethoxy-silane.

Examples of the epoxy-based coupling agent include 2-(3,4-epoxy-cyclohexyl)ethyl trimethoxy-silane, 3-glycidoxy-propyl-trimethoxy-silane, 3-glycidoxy-propyl-methyl-diethoxy-silane, and the like.

One of them may be solely used, or a mixture of two or more of them may be used.

The chemical pretreatment fluid can be coated by a method such as spraying, roll coating, curtain flow coating, or electrostatic coating.

The drying is needed to evaporate moisture, and the temperature of the drying is appropriately in a range of 60° C. to 140° C. in terms of the peak material temperature (PMT) of the stainless steel sheet. During the chemical pretreatment, a well-known prior treatment such as alkali degreasing or etching using an acid or an alkali may be carried out according to necessity.

The clear-coated films may be applied not only on the front surface side of the stainless steel sheet but also on the rear surface. In addition, any coated film other than the clear-coated film may be applied to the rear surface of the stainless steel sheet. The film thickness of the coated film on the rear surface of the stainless steel sheet may be approximately in a range of 1 μm to 6 μm. The kind of the resin is not particularly limited, and an epoxy-based resin, an acryl-based resin, a urethane-based resin, a polyester-based resin, or other resin can be used. As long as the coated film is present on the rear surface, the anti-pressure printing property becomes favorable.

According to the embodiment, favorable anti-pressure printing property and scratch resistance can be achieved by including a clear-coated film that contains the blocked isocyanate resin and the amino resin as the cross-linked curing resins for cross-linking and curing the acrylic resin, and further contain the cross-linking resin beads having a certain particle diameter.

EXAMPLES

Hereinafter, examples and comparative examples of the embodiment will be described.

Toluene and butyl acetate were fed at the amounts (parts by mass) as shown in Table 1 into a four-neck flask having a thermometer, a reflux condenser, a stirrer, a dropping funnel, and a nitrogen gas introduction pipe, a solution of toluene and butyl acetate was heated to 110° C., and subsequently, the solution was stirred while nitrogen gas was blown in. A mixture of raw materials selected from methyl methacrylate, styrene, n-butyl methacrylate, 2-hydroxy-ethyl methacrylate, 2-hydroxy-ethyl acrylate, methyl acrylate, and azobisisobutyronitrile (AIBN) was added dropwise to the solution for three hours while the solution was stirred in the above-described state. After completion of the adding dropwise, AIBN was further added, and a reaction was caused at the same temperature (110° C.) for three hours. Thereby, acryl-based copolymers (acrylic resin) having 50% by mass of a nonvolatile component were obtained.

The number average molecular weights and glass transition temperatures of the obtained acrylic resins are shown in Table 1.

TABLE 1

| | | Thermosetting resin composition | A-1 | A-2 | A-3 | A-4 | B-1 | B-2 |
|---|---|---|---|---|---|---|---|---|
| Acrylic resin | Raw materials | Toluene | 25 | 25 | 25 | 25 | 25 | 25 |
| | | Butyl acetate | 24 | 24 | 24.3 | 24.3 | 23 | 24.5 |
| | | Methyl methacrylate | 16 | 16 | 29 | 29 | 5 | 40.5 |
| | | Styrene | 5 | 5 | 5 | 5 | | 4 |
| | | n-Butyl methacrylate | 19.5 | 19.5 | 6.5 | 6.5 | 35.5 | |
| | | 2-Hydroxy ethyl methacrylate | 9 | 9 | 9 | 9 | | 5 |
| | | 2-Hydroxy ethyl acrylate | | | | | 9 | |

TABLE 1-continued

| | | Thermosetting resin composition | A-1 | A-2 | A-3 | A-4 | B-1 | B-2 |
|---|---|---|---|---|---|---|---|---|
| | | Methyl acrylate | 0.5 | 0.5 | 0.5 | 0.5 | 0.5 | 0.5 |
| | | AIBN | 1 | 1 | 0.7 | 0.7 | 2 | 0.5 |
| | Properties | Number average molecular weight | 5000 | 5000 | 20000 | 20000 | 2500 | 60000 |
| | | Glass transition temperature (° C.) | 60 | 60 | 80 | 80 | 20 | 100 |
| Cross-linked curing resin | Raw materials | Blocked isocyanate DESMODUR VPLS2253 (NCO content 10.5%) | 20 | 40 | 20 | 40 | 20 | 20 |
| | | Melamine resin CYMEL 327 | 20 | 20 | 20 | 20 | 20 | 20 |

The cross-linked curing resins as shown in Table 1 were mixed with the obtained acrylic resins so as to obtain thermosetting resin compositions A-1 to B-2. Meanwhile, DESMODUR VPLS2253 having a content of an NCO group of 10.5% (manufactured by Sumika Bayer Urethane Co., Ltd.) was used as the blocked isocyanate of the cross-linked curing resin. In addition, CYMEL 327 (manufactured by Mitsui Cytec Ltd.) was used as the melamine resin. The mixing ratios between the acrylic resin and the cross-linked curing resin are as shown in Table 1.

Meanwhile, the blending ratios in Table 1 are in terms of parts by mass.

The addition components and resin beads as shown in Tables 2 to 4 were mixed with the obtained thermosetting resin compositions A-1 to B-2 so as to obtain resin compositions for clear coating of Examples 1 to 14 and Comparative examples 1 to 5.

Meanwhile, all the units of the blending amounts in Tables 2 to 4 are parts by mass. However, since the thinner added during the mixing volatilizes during the drying, the parts by mass of the resin beads relative to 100 parts by mass of the solid content of the thermosetting resin composition is denoted as "resin beads/solid content of thermosetting resin composition."

TABLE 2

| Resin composition for clear coating | | Example 1 | Example 2 | Example 3 | Example 4 | Comparative example 1 | Comparative example 2 |
|---|---|---|---|---|---|---|---|
| Thermosetting resin compositions | Thermosetting resin composition A-1 | 55 | 0 | 0 | 0 | 0 | 0 |
| | Thermosetting resin composition A-2 | 0 | 55 | 0 | 0 | 0 | 0 |
| | Thermosetting resin composition A-3 | 0 | 0 | 55 | 0 | 0 | 0 |
| | Thermosetting resin composition A-4 | 0 | 0 | 0 | 55 | 0 | 0 |
| | Thermosetting resin composition B-1 | 0 | 0 | 0 | 0 | 55 | 0 |
| | Thermosetting resin composition B-2 | 0 | 0 | 0 | 0 | 0 | 55 |
| Added components | Thinner | 33 | 33 | 33 | 33 | 33 | 33 |
| | Acid catalyst | 0.3 | 0.3 | 0.3 | 0.3 | 0.3 | 0.3 |
| | Tin catalyst | 0.03 | 0.03 | 0.03 | 0.03 | 0.03 | 0.03 |
| | Leveling agent | 0.1 | 0.1 | 0.1 | 0.1 | 0.1 | 0.1 |
| | Defoamer | 0.1 | 0.1 | 0.1 | 0.1 | 0.1 | 0.1 |
| | Polyethylene wax | 2 | 2 | 2 | 2 | 2 | 2 |
| Resin beads | A (average particle diameter: 3 μm) | 1.2 | 1.2 | 1.2 | 1.2 | 1.2 | 1.2 |
| | B (average particle diameter: 7 μm) | — | — | — | — | — | — |
| | C (average particle diameter: 10 μm) | — | — | — | — | — | — |
| | D (average particle diameter: 3 μm) | — | — | — | — | — | — |
| | E (average particle diameter: 3 μm) | — | — | — | — | — | — |
| | F (average particle diameter: 3.5 μm) | — | — | — | — | — | — |
| Resin beads/solid content thermosetting resin composition (%) | | 2.09 | 2.09 | 2.09 | 2.09 | 2.09 | 2.09 |
| Film thickness of clear-coated film (μm) | | 3.5 | 3.5 | 3.5 | 3.5 | 3.5 | 3.5 |
| Average particle diameter of resin beads/coated film thickness | | 0.86 | 0.86 | 0.86 | 0.86 | 0.86 | 0.86 |
| Anti-pressure printing property | | 5 | 4 | 5 | 5 | 2 | 2 |
| Scratch resistance | | 4 | 5 | 5 | 4 | 1 | 2 |
| Workability of coated film | | 4 | 5 | 5 | 5 | 3 | 2 |
| Surface hardness of coated film | | 5 | 4 | 5 | 4 | 1 | 2 |
| Glossiness | | 4 | 5 | 5 | 4 | 4 | 3 |
| Chemical resistance | | 4 | 4 | 5 | 5 | 2 | 2 |

TABLE 3

| Resin composition for clear coating | | Example 5 | Example 6 | Example 7 | Comparative example 3 | Comparative example 4 | Comparative example 5 |
|---|---|---|---|---|---|---|---|
| Thermosetting resin compositions | Thermosetting resin composition A-1 | 55 | 55 | 55 | 55 | 55 | 55 |
| | Thermosetting resin composition A-2 | 0 | 0 | 0 | 0 | 0 | 0 |
| | Thermosetting resin composition A-3 | 0 | 0 | 0 | 0 | 0 | 0 |
| | Thermosetting resin composition A-4 | 0 | 0 | 0 | 0 | 0 | 0 |

TABLE 3-continued

| Resin composition for clear coating | | Example 5 | Example 6 | Example 7 | Comparative example 3 | Comparative example 4 | Comparative example 5 |
|---|---|---|---|---|---|---|---|
| | Thermosetting resin composition B-1 | 0 | 0 | 0 | 0 | 0 | 0 |
| | Thermosetting resin composition B-2 | 0 | 0 | 0 | 0 | 0 | 0 |
| Added components | Thinner | 33 | 33 | 33 | 33 | 33 | 33 |
| | Acid catalyst | 0.3 | 0.3 | 0.3 | 0.3 | 0.3 | 0.3 |
| | Tin catalyst | 0.03 | 0.03 | 0.03 | 0.03 | 0.03 | 0.03 |
| | Leveling agent | 0.1 | 0.1 | 0.1 | 0.1 | 0.1 | 0.1 |
| | Defoamer | 0.1 | 0.1 | 0.1 | 0.1 | 0.1 | 0.1 |
| | Polyethylene wax | 2 | 2 | 2 | 2 | 2 | 2 |
| Resin beads | A (average particle diameter: 3 μm) | 0.4 | 0.6 | 2.2 | 0.1 | 3.0 | 4.0 |
| | B (average particle diameter: 7 μm) | — | — | — | — | — | — |
| | C (average particle diameter: 10 μm) | — | — | — | — | — | — |
| | D (average particle diameter: 3 μm) | — | — | — | — | — | — |
| | E (average particle diameter: 13 μm) | — | — | — | — | — | — |
| | F (average particle diameter: 3.5 μm) | — | — | — | — | — | — |
| Resin beads/solid content of thermosetting resin composition (%) | | 0.70 | 1.04 | 3.82 | 0.17 | 5.21 | 6.95 |
| Film thickness of clear-coated film (μm) | | 3.5 | 3.5 | 3.5 | 3.5 | 3.5 | 3.5 |
| Average particle diameter of resin beads/coated film thickness | | 0.86 | 0.86 | 0.86 | 0.86 | 0.86 | 0.86 |
| Anti-pressure printing property | | 4 | 4 | 5 | 1 | 5 | 4 |
| Scratch resistance | | 5 | 5 | 5 | 4 | 5 | 5 |
| Workability of coated film | | 4 | 4 | 4 | 2 | 3 | 2 |
| Surface hardness of coated film | | 5 | 5 | 5 | 5 | 5 | 5 |
| Glossiness | | 4 | 4 | 4 | 4 | 3 | 3 |
| Chemical resistance | | 4 | 4 | 4 | 4 | 4 | 4 |

TABLE 4

| Resin composition for clear coating | | Example 8 | Example 9 | Example 10 | Example 11 | Example 12 | Example 13 | Example 14 |
|---|---|---|---|---|---|---|---|---|
| Thermosetting resin compositions | Thermosetting resin composition A-1 | 55 | 55 | 55 | 55 | 55 | 55 | 55 |
| | Thermosetting resin composition A-2 | 0 | 0 | 0 | 0 | 0 | 0 | 0 |
| | Thermosetting resin composition A-3 | 0 | 0 | 0 | 0 | 0 | 0 | 0 |
| | Thermosetting resin composition A-4 | 0 | 0 | 0 | 0 | 0 | 0 | 0 |
| | Thermosetting resin composition B-1 | 0 | 0 | 0 | 0 | 0 | 0 | 0 |
| | Thermosetting resin composition B-3 | 0 | 0 | 0 | 0 | 0 | 0 | 0 |
| Added components | Thinner | 33 | 33 | 33 | 33 | 33 | 33 | 33 |
| | Acid catalyst | 0.3 | 0.3 | 0.3 | 0.3 | 0.3 | 0.3 | 0.3 |
| | Tin catalyst | 0.03 | 0.03 | 0.03 | 0.03 | 0.03 | 0.03 | 0.03 |
| | Leveling agent | 0.1 | 0.1 | 0.1 | 0.1 | 0.1 | 0.1 | 0.1 |
| | Defoamer | 0.1 | 0.1 | 0.1 | 0.1 | 0.1 | 0.1 | 0.1 |
| | Polyethylene wax | 2 | 2 | 2 | 2 | 2 | 2 | 2 |
| Resin beads | A (average particle diameter: 3 μm) | 1.2 | — | 1.2 | — | — | — | — |
| | B (average particle diameter: 7 μm) | — | 1.2 | — | — | — | — | — |
| | C (average particle diameter: 10 μm) | — | — | — | 1.2 | — | — | — |
| | D (average particle diameter: 3 μm) | — | — | — | — | 1.2 | — | — |
| | E (average particle diameter: 3 μm) | — | — | — | — | — | 1.2 | — |
| | F (average particle diameter: 3.5 μm) | — | — | — | — | — | — | 1.2 |
| Resin beads/solid content of thermosetting resin composition (%) | | 2.09 | 2.09 | 2.09 | 2.09 | 2.09 | 2.09 | 2.09 |
| Film thickness of clear-coated film (μm) | | 3 | 10 | 18 | 3 | 3.5 | 3.5 | 3.5 |
| Average particle diameter of resin beads/coated film thickness | | 1.0 | 0.70 | 0.17 | 3.3 | 0.86 | 0.86 | 1.0 |
| Anti-pressure printing property | | 5 | 4 | 4 | 4 | 5 | 5 | 4 |
| Scratch resistance | | 5 | 5 | 4 | 4 | 4 | 5 | 4 |
| Workability of coated film | | 4 | 4 | 4 | 4 | 4 | 4 | 4 |
| Surface hardness of coated film | | 5 | 5 | 5 | 5 | 5 | 5 | 5 |
| Glossiness | | 4 | 4 | 4 | 4 | 4 | 4 | 5 |
| Chemical resistance | | 4 | 4 | 4 | 4 | 4 | 4 | 4 |

An SUS430/No. 4 polished finish material was used as the stainless steel sheet.

A non-chromate chemical pretreatment fluid was coated on the stainless steel sheet through roll coating. The chemical pretreatment fluid was coated under conditions where the adhesion amount of $SiO_2$ became in a range of 2 mg/m² to 10 mg/m². Meanwhile, the adhesion amount of $SiO_2$ was measured using fluorescent X-rays. Next, the stainless steel sheet was dried under conditions where the peak material temperature (PMT) became 100° C.

Next, each of the obtained resin compositions for clear coating was coated on the stainless steel sheet through bar coating under conditions where the coated amount became in a range of 3.0 g/m² to 4.0 g/m². Then, the stainless steel sheets were baked under conditions where the peak material temperature (PMT) became 232° C. so as to obtain clear-coated stainless steel sheets of Examples 1 to 7 and Comparative examples 1 to 5 as shown in Tables 2 and 3.

In addition, as shown in Table 4, clear-coated stainless steel sheets of Examples 8 to 11 were obtained so that the coating thicknesses became 3 μm, 10 μm, and 18 μm in order to confirm the influences of the thickness of the coated film and the average particle diameter of the resin beads.

Furthermore, as shown in Table 4, clear-coated stainless steel sheets of Examples 12 to 14 were obtained in order to confirm the influences of the kinds of the resin beads.

Meanwhile, in Tables 2 to 4, the added amounts of the thermosetting resin compositions show the parts by mass of the solid contents. The added amounts of an acid catalyst (p-toluene sulfonic acid), a tin catalyst (di-n-butyl tin dilaurate), a leveling agent, and a defoamer (both of the leveling agent and the defoamer are acryl-based resins) show the parts by mass of the active components (the main components from which the solvent or the like were removed).

The resin beads A to C are cross-linked acrylic resin beads manufactured by Ganz Chemical Co., Ltd., and the average particle diameters are 3 μm for the resin beads A, 7 μm for the resin beads B, and 10 μm for the resin beads C. The resin beads D are cross-linked polyurethane resin beads manufactured by Negami Chemical Industrial Co., Ltd., and the average particle diameter is 3 μm. The resin beads E are fluororesin-based beads manufactured by Asahi Glass Co., Ltd., and the average particle diameter is 3 μm. The resin beads F used in Example 14 are PE resin beads manufactured by BYK-Chemie, and the average particle diameter is 3.5 μm.

CERAFLOUR 961 (manufactured by BYK-Chemie) having an average particle diameter of 3.5 μm was used as the polyethylene wax.

With regard to the clear-coated stainless steel sheets of Examples 1 to 14 and Comparative examples 1 to 5, the anti-pressure printing property, scratch resistance, the workability, hardness, glossiness, and chemical resistance of the clear-coated films were investigated.

The evaluation methods were as follows. The results are shown in Tables 2 to 4.

(1) Anti-Pressure Printing Property

Two pieces of a test material were stacked and pressed at a pressure of 10 kg/cm$^2$ in an atmosphere at 40° C. The pressed state of the test material was held for 24 hours. After 24 hours, the anti-pressure printing property was evaluated. The evaluations were carried out based on the following five grades of ranks 1 to 5.

Rank 5: No pressure printing (pass)
Rank 4: Few pressure printings were noticed (pass).
Rank 3: Pressure printings could be confirmed clearly according to viewing angles (fail).
Rank 2: Some pressure printings were noticed which caused deterioration in the tone and gloss (fail).
Rank 1: The gloss was greatly degraded, and pressure printings could be confirmed in all directions (fail).

(2) Scratch Resistance

As a rubbing unit, a gauze soaked with a cleanser was brought into contact with the surface of the test material at a load of 200 g. The gauze was rubbed back and forth 50 times in the above-described state so as to polish the surface of the test material. Then, the scratch resistance was evaluated. The evaluations were carried out based on the following five grades of ranks 1 to 5.

Rank 5: No scratches (pass)
Rank 4: Few scratches were noticed (pass).
Rank 3: Scratches could be confirmed clearly (fail).
Rank 2: The coated film lost gloss due to scratches (fail).
Rank 1: The coated film was removed, and the base material appeared (fail).

(3) Workability of the Coated Films

The workability was evaluated according to JIS K5600 5-2 (cupping resistance). The evaluations were carried out based on the following five grades of ranks 1 to 5 according to the depths at which cracking occurred.

Rank 5: 7 mm or more (pass)
Rank 4: 5 mm to 7 mm (pass)
Rank 3: 3 mm to 5 mm (fail)
Rank 2: 1 mm to 3 mm (fail)
Rank 1: 1 mm or less (fail)

(4) The Surface Hardness of the Coated Films

The surface hardness was evaluated according to JIS K5600 5-4 (scratch hardness (pencil method)). The evaluations were carried out based on the following five grades of ranks 1 to 5.

Rank 5: 4H or more (pass)
Rank 4: 3H (pass)
Rank 3: 2H (fail)
Rank 2: H (fail)
Rank 1: less than H (fail)

(5) Glossiness

The glossiness was evaluated according to JIS K5600 4-7 of degree of specular gloss. The evaluations were carried out based on the following five grades of ranks 1 to 5.

Rank 5: 100 or more (pass)
Rank 4: 80 to 100 (pass)
Rank 3: 60 to 80 (fail)
Rank 2: 40 to 60 (fail)
Rank 1: less than 40 (fail)

(6) Chemical Resistance 2 mL of 5% sulfuric acid and 2 mL of 5% sodium hydroxide were added dropwise respectively on the test material, and the test material was sealed with a lid.

The sealed state was maintained for 16 hours. After that, the state of the coated film was observed and evaluated. The evaluations were carried out based on the following five grades of ranks 1 to 5.

Rank 5: No trace (pass)
Rank 4: Traces were barely noticed (pass).
Rank 3: Traces were slightly noticed (fail).
Rank 2: Traces remained thickly (fail).
Rank 1: The coated film was separated (fail).

It was found from the evaluation results of Examples 1 to 14 that a clear-coated stainless steel sheet with excellent anti-pressure printing property and excellent scratch resistance can be obtained by including a clear coated film, and the clear coated film contains a thermosetting resin composition and a predetermined amount of resin beads having a predetermined average particle diameter. The thermosetting resin composition contains a blocked isocyanate resin and an amino resin as resins for cross-linking and curing an acrylic resin.

In detail, Examples 1 to 9, 12, and 13 included the thermosetting resin compositions of A-1 to A-4 and predetermined amounts of resin beads, and the ratios of average particle diameter of the resin beads/coating thickness were in a range of 0.20 to 3.0. Therefore, the evaluations with regard to either one or both of the anti-pressure printing property and the scratch resistance were very favorable, being 5.

Examples 10 and 11 are examples of cases in which the coating thicknesses with respect to the average particle diameter of the resin beads were thin and thick respectively. In any cases, since predetermined amounts of the resin beads were included, the anti-pressure printing property and the scratch resistance were on a pass level.

Example 14 is an example in which the kind of the resin beads was PE. Since a predetermined amount of the resin beads were included, the anti-pressure printing property and the scratch resistance were on a pass level.

On the other hand, with regard to comparative examples, the example in which the thermosetting resin composition of B-1 was used (Comparative example 1) was inferior in not only anti-pressure printing property and scratch resistance but also important ordinary features of the clear-coated film such as workability, hardness, and chemical resistance.

The example in which the thermosetting resin composition of B-2 was used (Comparative example 2) was inferior in all of the evaluation items.

The example in which the content of the resin beads was small (Comparative example 3) was inferior in anti-pressure printing property and workability of the coated film.

The examples in which the contents of the resin beads were large (Comparative examples 4 and 5) were excellent in anti-pressure printing property and the scratch resistance, but were inferior in workability and glossiness of the coated films, and the glossiness is important as the designability of the clear-coated stainless steel sheet.

INDUSTRIAL APPLICABILITY

According to the present invention, it is possible to provide a clear-coated stainless steel sheet that maintains the designability of a stainless steel sheet and is excellent in the anti-pressure printing property and the scratch resistance. The clear-coated stainless steel sheet can be suitably applied to chassis of home appliances, interior furnishing materials, and external materials in which the aesthetically pleasing metallic gloss of a stainless steel is applied.

The invention claimed is:

1. A clear-coated stainless steel sheet with excellent anti-pressure printing property and excellent scratch resistance, comprising:
a stainless steel sheet; and
a clear-coated film coated on either one or both of two main surfaces of the stainless steel sheet,
wherein the clear-coated film contains a thermosetting resin composition (A) and resin beads (B) at a content in a range of 0.5 parts by mass to 4.0 parts by mass relative to 100 parts by mass of a solid content of the thermosetting resin composition (A),
the thermosetting resin composition (A) includes an acrylic resin (A1) and a cross-linked curing resin (A2) composed of a blocked isocyanate resin and an amino resin which cross-link and cure the acrylic resin (A1), and
the acrylic resin (A1) includes one or more cross-linking functional groups selected from the group consisting of a hydroxyl group, a carboxylic group, and an alkoxy silane group, the acrylic resin (A1) has a glass transition temperature of 30° C. to 90° C., and has a number average molecular weight of 3000 to 50000 and
wherein a film thickness of the clear-coated film is in a range of 3 to 5 μm, and an average particle diameter of the resin beads (B) is in a range of 0.8 times to 1.0 times the film thickness such that an average particle diameter of the resin beads (B) is in a range of 2.4 to 5 μm.

2. The clear-coated stainless steel sheet with excellent anti-pressure printing property and excellent scratch resistance according to claim 1,
wherein the resin beads (B) are one or more beads selected from the group consisting of cross-linked acrylic resin beads, cross-linked polyurethane resin beads, and fluororesin beads.

* * * * *

UNITED STATES PATENT AND TRADEMARK OFFICE
CERTIFICATE OF CORRECTION

PATENT NO. : 8,623,502 B2  Page 1 of 1
APPLICATION NO. : 13/636532
DATED : January 7, 2014
INVENTOR(S) : Hiroyuki Matsuyama et al.

It is certified that error appears in the above-identified patent and that said Letters Patent is hereby corrected as shown below:

In the Specification

Column 5, line 21, change "ϵ-caprolactams" to -- ε-caprolactams --;

Column 13, line 61, change "2 m g/m²" to -- 2 mg/m² --.

Signed and Sealed this
Second Day of September, 2014

Michelle K. Lee
*Deputy Director of the United States Patent and Trademark Office*